United States Patent
Lee et al.

(10) Patent No.: US 11,493,223 B2
(45) Date of Patent: *Nov. 8, 2022

(54) AIR CONDITIONER

(71) Applicant: LG ELECTRONICS INC., Seoul (KR)

(72) Inventors: Kyongdo Lee, Seoul (KR); Juntae Kim, Seoul (KR); Kwonhyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 73 days.

This patent is subject to a terminal disclaimer.

(21) Appl. No.: 16/760,129

(22) PCT Filed: Oct. 30, 2018

(86) PCT No.: PCT/KR2018/012985
§ 371 (c)(1),
(2) Date: Apr. 29, 2020

(87) PCT Pub. No.: WO2019/088639
PCT Pub. Date: May 9, 2019

(65) Prior Publication Data
US 2020/0256579 A1    Aug. 13, 2020

(30) Foreign Application Priority Data

Oct. 30, 2017    (KR) .......................... 10-2017-0142582

(51) Int. Cl.
*G05B 21/00*    (2006.01)
*G01M 1/38*    (2006.01)
(Continued)

(52) U.S. Cl.
CPC .............. *F24F 11/56* (2018.01); *F24F 11/30* (2018.01); *F24F 13/20* (2013.01)

(58) Field of Classification Search
CPC .. F24F 11/30; F24F 11/56; F24F 11/62; F24F 13/20; H01Q 1/22; H04B 7/0413
See application file for complete search history.

(56) References Cited

U.S. PATENT DOCUMENTS

| 6,141,356 A | 10/2000 | Gorman |
| 6,290,141 B1 | 9/2001 | Park |

(Continued)

FOREIGN PATENT DOCUMENTS

| CN | 204063466 | 12/2014 |
| JP | 04-268156 | 9/1992 |

(Continued)

OTHER PUBLICATIONS

U.S. Appl. No. 16/144,119, filed Sep. 27, 2018.
(Continued)

*Primary Examiner* — Zhipeng Wang
(74) *Attorney, Agent, or Firm* — Ked & Associates (57) ABSTRACT

Disclosed is an air conditioner including a plurality of units having an outdoor unit and an indoor unit. The plurality of units includes a controller configured to control an input/output and control to operate according to setting and a communication unit configured to transmit and receive data in a wireless communication method between the plurality of units. The communication unit includes a plurality of antenna connection units respectively connected to the plurality of antennas, and a transmission/reception unit configured to apply a signal of a certain frequency band to the plurality of antennas through the plurality of antenna connection units, and to process a signal received from the plurality of antennas. The communication unit includes a plurality of antennas, and is configured to transmit and receive data through multiple input and output, so that the plurality of units can directly communicate wirelessly, specify a frequency of a signal used in consideration of (Continued)

obstacles in a building and installation distances, and perform multiple input and output by using the plurality of antennas, thereby achieving stable communication by securing communication coverage, and improving efficiency and stability according to the management and operation of the air conditioner.

20 Claims, 7 Drawing Sheets (51) Int. Cl.
  *G05B 13/00*  (2006.01)
  *G05B 15/00*  (2006.01)
  *G05D 23/00*  (2006.01)
  *F24F 11/56*  (2018.01)
  *F24F 11/30*  (2018.01)
  *F24F 13/20*  (2006.01)

(56) References Cited

U.S. PATENT DOCUMENTS

| | | | |
|---|---|---|---|
| 10,015,259 B1 | 7/2018 | Frigo | |
| 2002/0080739 A1 | 6/2002 | Kuwahara | |
| 2006/0082489 A1 | 4/2006 | Liu | |
| 2007/0280681 A1 | 12/2007 | Frankel | |
| 2008/0069041 A1 | 3/2008 | Tandai | |
| 2011/0140972 A1 | 6/2011 | Besore et al. | |
| 2011/0286497 A1 | 11/2011 | Nervig | |
| 2012/0057651 A1 | 3/2012 | Kim | |
| 2012/0232815 A1 | 9/2012 | Kang | |
| 2013/0058380 A1 | 3/2013 | Kim | |
| 2013/0297080 A1 | 11/2013 | Ko et al. | |
| 2014/0345826 A1 | 11/2014 | Kim et al. | |
| 2014/0362688 A1 | 12/2014 | Zhang | |
| 2015/0128618 A1* | 5/2015 | Park | F24F 11/30 62/56 |
| 2016/0154413 A1* | 6/2016 | Trivedi | F24F 11/62 700/276 |
| 2016/0315651 A1 | 10/2016 | Hong | |
| 2016/0359531 A1* | 12/2016 | Suh | H04B 7/0665 |
| 2017/0041954 A1 | 2/2017 | Tsai | |
| 2017/0241659 A1* | 8/2017 | Choi | G05D 23/1917 |
| 2017/0245153 A1 | 8/2017 | Singh | |
| 2017/0317906 A1 | 11/2017 | Tsai | |
| 2017/0328593 A1* | 11/2017 | Enya | G05B 19/0428 |
| 2017/0363311 A1* | 12/2017 | Lee | F24F 1/0003 |
| 2018/0166794 A1 | 6/2018 | Raphaeli | |
| 2018/0294547 A1* | 10/2018 | Park | H01Q 3/24 |
| 2018/0338335 A1 | 11/2018 | Mukherjee | |
| 2018/0343670 A1 | 11/2018 | Park | |
| 2019/0041080 A1* | 2/2019 | Higuchi | F24F 11/56 |
| 2019/0093915 A1 | 3/2019 | Lee | |
| 2021/0194515 A1* | 6/2021 | Go | H04B 1/04 |

FOREIGN PATENT DOCUMENTS

| | | |
|---|---|---|
| JP | 04268156 A * | 9/1992 |
| JP | 2004-197993 | 7/2004 |
| JP | 2006-336883 | 12/2006 |
| JP | 2012-039407 | 2/2012 |
| JP | 2014-003483 | 1/2014 |
| KR | 20-1994-0008595 | 12/1994 |
| KR | 10-2010-0090928 | 8/2010 |
| KR | 10-2010-0123486 | 11/2010 |
| KR | 10-2011-0040051 | 4/2011 |
| KR | 10-2011-0108739 | 10/2011 |
| KR | 10-2012-0085118 | 7/2012 |
| KR | 10-2013-0045747 | 5/2013 |
| KR | 10-2013-0143125 | 12/2013 |
| KR | 10-1406684 | 6/2014 |
| KR | 10-2014-0099020 | 8/2014 |
| KR | 10-2014-0129779 | 11/2014 |
| KR | 10-2016-0004712 | 1/2016 |
| KR | 10-2016-0061208 | 5/2016 |
| WO | WO 2012/099372 | 7/2012 |

OTHER PUBLICATIONS

U.S. Notice of Allowance issued in U.S. Appl. No. 16/144,119 dated Apr. 22, 2020.
International Search Report (with English Translation) dated Feb. 27, 2020 issued in Application No. PCT/KR2018/012985.
International Search Report issued in Application No. PCT/KR2018/012985 dated Feb. 27, 2019.
European Search Report issued in Application No. 18874051.8 dated Jul. 13, 2021.
Korean Office Action issued in Application No. 10-2017-0183202 dated May 13, 2019.
European Search Report issued in Application No. 18211575.8 dated May 24, 2019.
U.S. Office Action issued in U.S. Appl. No. 16/233,480 dated Dec. 8, 2020.
Korean Notice of Allowance issued in Application No. 10-2017-0183202 dated Feb. 17, 2021.
Korean Office Action issued in Application No. 10-2017-0142582 dated Dec. 18, 2021.

* cited by examiner

AIR CONDITIONER

CROSS-REFERENCE TO RELATED PATENT APPLICATIONS

This application is a U.S. National Stage Application under 35 U.S.C. § 371 of PCT Application No. PCT/KR2018/012985, filed Oct. 30, 2018, which claims priority to Korean Patent Application No. 10-2017-0142582, filed Oct. 30, 2017, whose entire disclosures are hereby incorporated by reference.

TECHNICAL FIELD

The present disclosure relates to an air conditioner, and more particularly, to an air conditioner in which a plurality of air conditioner units wirelessly transmit and receive data.

BACKGROUND ART

An air conditioner is installed to provide a more comfortable indoor environment to human beings by discharging cold and warm air into the room, adjusting the indoor temperature, and purifying the indoor air so as to create a comfortable indoor environment. In general, an air conditioner includes an indoor unit configured of a heat exchanger and installed inside a room, and an outdoor unit configured of a compressor and a heat exchanger and supplying refrigerant to the indoor unit.

The air conditioner is separated into an indoor unit configured of a heat exchanger, and an outdoor unit configured of a compressor and a heat exchanger, and the outdoor unit and the indoor unit are connected to a refrigerant pipe such that the refrigerant compressed from the compressor of the outdoor unit is supplied to the heat exchanger of the indoor unit through the refrigerant pipe, and the refrigerant heat-exchanged in the heat exchanger of the indoor unit flows back into the compressor of the outdoor unit through the refrigerant pipe. Accordingly, the indoor unit discharges cold and warm air into the room through heat exchange using a refrigerant.

The air conditioner is interconnected in a unit of building or small group to transmit and receive data, and monitors and controls the state of each unit through the transmitted and received data.

The air conditioner uses a wired communication method as each unit is connected by a communication line. According to the structure of connecting the communication line, the indoor unit is generally configured to transmit data to the outdoor unit, and the outdoor unit is configured to receive data of the indoor unit and transmit the data of the indoor unit to the controller.

In this communication structure, the indoor unit cannot communicate directly with the controller and must go through the outdoor unit, and the outdoor unit processes data of a plurality of indoor units. Therefore, communication should be achieved in stages and a delay occurs so that it is not possible to quickly respond to generated data.

Japanese Patent Application 2006-336883 discloses that an indoor unit is provided with a wireless communication device and used as a repeater for wireless communication of a communication terminal used indoors.

An antenna for wireless communication is installed in the indoor unit, and the antenna is installed to protrude toward the floor from a ceiling type indoor unit.

However, the Japanese patent application discloses an antenna that is additionally installed, and there is a problem in that the antenna should be separately installed and, furthermore, protrudes to the outside.

In addition, when a unit and a unit communicate wirelessly in the air conditioner, smooth communication is possible in one floor, but there is a limit in the signal transmission in a building having five or more floors so that communication is not easy. In particular, in an installation environment where the outdoor unit is installed in the basement of building or installed on the roof, it is difficult to communicate wirelessly due to the distance between the outdoor unit and the indoor unit, and the quality of signal is lowered, for example, the signal is attenuated due to an obstacle such as wall in the building. Accordingly, the stability of the communication is lowered.

PRIOR ART DOCUMENT

Patent Document

Japanese Patent Publication 2006-336883

DISCLOSURE

Technical Problem

An object of the present disclosure is to provide an air conditioner, and an air conditioner in which a plurality of units constituting the air conditioner wirelessly transmit and receive data to monitor and control operations.

Technical Solution

An air conditioner of the present disclosure includes a plurality of units having an outdoor unit and an indoor unit. The plurality of units includes: a controller configured to control an input/output and control to operate according to setting and a communication unit configured to transmit and receive data in a wireless communication method between the plurality of units through the plurality of antennas. The communication unit transmits and receives data through multiple input and output using the plurality of antennas.

The communication unit includes first to fourth antennas. The plurality of antennas are installed in a case of the unit. The plurality of antennas are installed in four corners of a case of the unit.

A first unit of the plurality of units communicates with a second unit to a fifth unit by using the plurality of antennas, respectively.

The first unit among the plurality of units transmits the same data respectively to the second unit by using the plurality of antennas.

The first unit among the plurality of units transmits the plurality of data respectively to the second unit by using the plurality of antennas.

The first unit transmits first data to the second unit through a first antenna among the plurality of antennas, and to a third unit through a second antenna.

The first unit transmits first data to the second unit through a first antenna among the plurality of antennas, and transmits second data to a third unit through a second antenna.

The first unit transmits first data to the second unit through a first antenna among the plurality of antennas, and receives third data from a third unit through a second antenna.

The first unit transmits first data to the second unit through a first antenna, among the plurality of antennas, and transmits second data to the second unit through a second antenna.

The first unit transmits first data to the second unit through first to fourth antennas, respectively, and the second unit receives the first data multiple times through the plurality of antennas.

The communication unit transmits and receives data wirelessly by using a frequency set in response to a signal loss according to a length of the antenna, a distance, and an inter-floor loss according to a number of transmitted floors.

The plurality of antennas are an omni-directional antenna that transmits and receives signals regardless of the installation location.

The communication unit 125 the transmission/reception unit 125 supports a Multiple Input Multiple Output (MIMO).

The communication unit performs communication by using a signal of any one of 400 Mhz band and 900 Mhz band in correspondence with an installation position and an installation country of the plurality of units.

The communication unit includes a plurality of antenna connection units respectively connected to the plurality of antennas; and a transmission/reception unit configured to apply a signal of a certain frequency band to the plurality of antennas through the plurality of antenna connection units, and to process a signal received from the plurality of antennas.

Advantageous Effects

The air conditioner according to the present disclosure configured as described above is configured such that a plurality of units of the air conditioner are configured to transmit and receive data in a wireless communication method, so that it is possible to directly communicate wirelessly between the indoor units and between the indoor unit and the outdoor unit regardless of the installation environment, and the indoor unit and the controller can communicate directly without passing through the outdoor unit.

The present disclosure does not install a separate communication line, so that it can be easily installed and it is possible to reduce the cost of installation and operation, and the aesthetic effect on the appearance of the unit can be expected as the antenna is installed inside.

In addition, the present disclosure may specify a frequency of a signal used in consideration of obstacles in a building and installation distances, and perform multiple input and output by using the plurality of antennas, thereby achieving stable communication by securing communication coverage, and improving efficiency and stability in the management and operation of the air conditioner.

MODE FOR INVENTION

Hereinafter, preferred embodiments of the present disclosure will be described with reference to the accompanying drawings. In describing the present embodiment, the same designations and the same reference numerals are used for the same components, and further description thereof will be omitted.

Hereinafter, an embodiment of the present disclosure will be described in detail with reference to the drawings.

Figure 1:
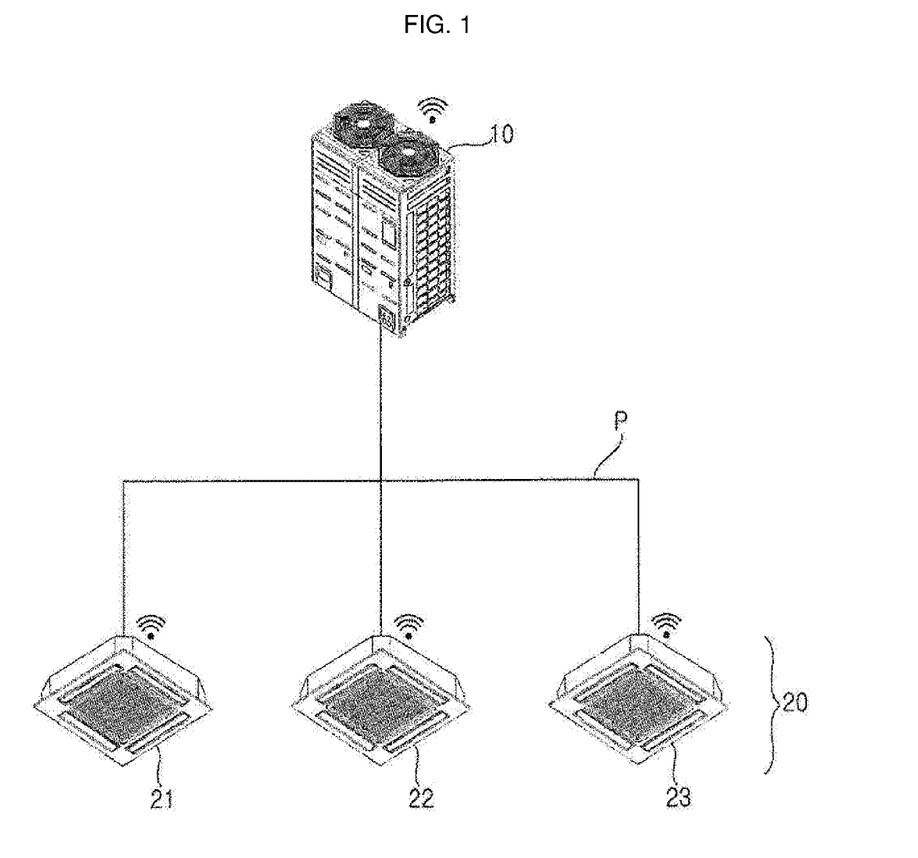
FIG. 1 is a view showing a configuration of an air conditioner according to an embodiment of the present disclosure.

FIG. 1 is a view showing a configuration of an air conditioner according to an embodiment of the present disclosure.

As shown in FIG. 1, the air conditioner includes an outdoor unit 10 and an indoor unit 20. In addition, the air conditioner may further include a controller (not shown) that controls the outdoor unit and the indoor unit, and may further include a ventilation device, an air cleaning device, a humidifying device, a heater and, depending on the scale, a chiller, an air conditioning unit, a cooling tower, etc, in addition to the indoor unit and the outdoor unit. The air conditioner may be operated in conjunction with the operation of the indoor unit and the outdoor unit by interconnecting each unit, and may be operated in connection with a mobile device, a security device, and an alarm device inside a building.

The outdoor unit 10 is connected to each of the indoor unit 20 by refrigerant pipes, and supplies refrigerant to the indoor unit. In addition, the outdoor unit 10 periodically communicates with a plurality of indoor units through a wireless communication method to transmit and receive mutual data, and changes the operation according to the operation setting changed by the indoor unit.

The indoor unit 20 includes an electronic expansion valve (not shown) for expanding the refrigerant supplied from the outdoor unit 10, an indoor heat exchanger (not shown) for heat exchange of refrigerant, an indoor fan (not shown) that allows indoor air to flow into the indoor heat exchanger and allows the heat-exchanged air to be exposed to the room, a plurality of sensors (not shown), and a control means (not shown) for controlling the operation of the indoor unit.

In addition, the indoor unit 20 includes a discharge port (not shown) for discharging heat-exchanged air, and the discharge port is provided with a wind direction control means (not shown) for opening and closing the discharge port and controlling the direction of the discharged air. The indoor unit controls the sucked air and the discharged air, and controls the air volume by controlling the rotation speed of the indoor fan. The indoor unit 20 may further include an output unit for displaying the operation state and setting information of the indoor unit and an input unit for inputting setting data. At this time, the indoor unit 20 may transmit the setting information on the operation of the air conditioner to a connected remote controller (not shown) to output the information through the remote controller and receive data.

The outdoor unit 10 operates in a cooling mode or a heating mode in response to data received from the indoor unit 20 or a control command of the controller through wireless communication, and supplies refrigerant to the connected indoor unit.

When a plurality of outdoor units are connected, each outdoor unit may be connected to a plurality of indoor units, and may supply refrigerant to the plurality of indoor units through a distributor.

The outdoor unit 10 includes at least one compressor that compresses the refrigerant and discharges a high-pressure gas refrigerant, an accumulator that separates gas refrigerant and liquid refrigerant from the refrigerant and prevents unvaporized liquid refrigerant from flowing into the compressor, an oil recoverer that recovers oil from refrigerant discharged from the compressor, an outdoor heat exchanger that condenses or evaporates refrigerant by heat exchange with outside air, an outdoor fan that introduces air into the outdoor heat exchanger and discharges the heat exchanged air to the outside so as to more smoothly perform the heat exchange of the outdoor heat exchanger, a four-way valve that changes the flow path of the refrigerant according to the operation mode of the outdoor unit, at least one pressure sensor for measuring pressure, at least one temperature sensor for measuring temperature, and a control component that controls the operation of the outdoor unit and communicates with other units.

The outdoor unit 10 further includes a plurality of other sensors, a valve, a supercooler, and the like, but the description thereof will be omitted below.

In addition, the air conditioner may transmit and receive data with other air conditioner through a network connection such as Internet. The air conditioner may access an external service center (not shown), a management server (not shown), a database (not shown), etc., and may communicate with an external terminal (not shown) connected through a network. The terminal (not shown) may access to the air conditioner to monitor and control the operation of the air conditioner as a second controller.

The air conditioner transmits and receives data through a mutual wireless communication method by a plurality of indoor units 20 and the outdoor unit 10. Depending on the installation environment, the air conditioner may communicate by using both wired and wireless communication methods.

The outdoor unit 10 is connected to first to third indoor units 21 to 23 and a refrigerant pipe P, and communicates with each other by a wireless communication method. A plurality of indoor units also transmit and receive data through the mutual wireless communication method.

As the outdoor unit and the indoor unit are connected by a refrigerant pipe (P), when the outdoor unit and the indoor unit interact by transmitting and receiving data through wireless communication, the refrigerant is supplied from the outdoor unit to the indoor unit.

The outdoor unit 10 periodically communicates with the plurality of indoor units 20 to transmit and receive mutual data, and changes the operation according to the operation setting changed by the indoor unit. When a controller is provided, the controller may also communicate with the indoor unit and the outdoor unit in a wireless communication method.

When a plurality of outdoor units are provided, depending on the connection scheme between the outdoor units, a plurality of indoor units may be connected to a plurality of outdoor units through piping. Alternatively, a plurality of indoor units may be respectively connected to a single outdoor unit through piping, and a plurality of outdoor units may communicate with each other wirelessly. When a plurality of outdoor units are provided, considering the flow of the refrigerant, the indoor unit connected to the outdoor unit through the refrigerant pipe may be set as one group, may communicate with each other through the same channel, and a group may be set based on the installation position of the indoor unit. The drawing is just an example, and it should be noted that the number of outdoor units and indoor units or the type of indoor unit is not limited thereto.

As described above, it is described that a group is set for the outdoor unit and the indoor unit in consideration of the flow of the refrigerant. However, in addition to the communication channel between the outdoor unit and the indoor unit, a communication channel including a controller, an outdoor unit, and an indoor unit may be separately set in the air conditioner.

The indoor unit 20 sets driving and transmits data to the outdoor unit in response to data input through an input unit provided, data input from a remote controller, or data received from the controller. The outdoor unit 10 controls the compressor by calculating a load according to the received indoor unit data and the operating state of the plurality of indoor units.

The outdoor unit 10 and the indoor unit 20 communicate with each other at certain time intervals, and output information related to operation state. In addition, when a controller is provided, data is transmitted to the controller so that data on failure or abnormality may be transmitted to the controller regardless of a cycle when a failure or abnormality occurs.

Figure 2:
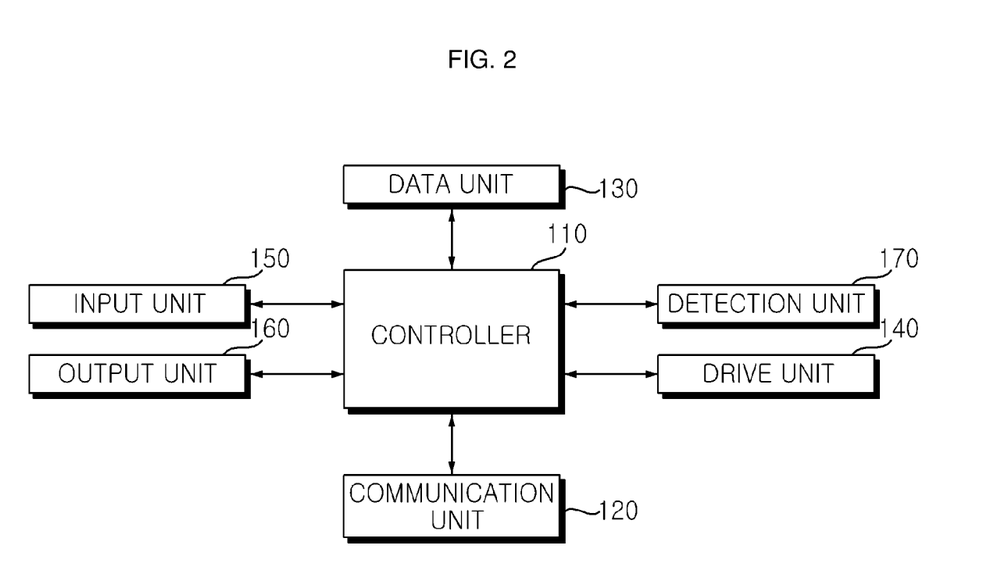
FIG. 2 is a block diagram schematically showing a control configuration of a unit of an air conditioner according to an embodiment of the present disclosure.

FIG. 2 is a block diagram schematically showing a control configuration of a unit of an air conditioner according to an embodiment of the present disclosure.

As shown in FIG. 2, the unit of the air conditioner includes a drive unit 140, a detection unit 170, a communication unit 120, an output unit 160, an input unit 150, a data unit 130, and a controller 110 for controlling the overall operation. This is a configuration commonly contained in each unit, and a separate configuration may be added according to characteristics of a product.

For example, the outdoor unit 10 includes a compressor, an outdoor fan, and a plurality of valves. The drive unit of the outdoor unit may be divided into a compressor drive unit, an outdoor fan drive unit, and a valve controller. The indoor unit 20 is provided with a louver or vane as a wind direction control means, and includes an indoor fan and a plurality of valves so that an indoor fan drive unit, a valve controller, a wind direction controller, and the like may be provided. In addition, depending on the type of unit, the type, the number, and the installation position of a sensor included in the detection unit are configured differently.

The data unit 130 stores control data for controlling the operation of a unit, communication data for setting address or group for communicating with other unit, data transmitted and received from outside, and operation data generated or detected during operation. The data unit 130 stores an execution program for each function of a unit, data for operation control, and data to be transmitted and received.

The data unit 130 may be various storage devices such as ROM, RAM, EPROM, flash drive, hard drive, and the like, in hardware.

The input unit 150 includes at least one input means among input means such as a button, a switch, and a touch input means. When a user command or certain data is input in response to the manipulation of the input means, the input unit 150 applies the input data to the controller 110. For example, the outdoor unit may be provided with a power key, a test drive key, an address setting key, and an indoor unit may be provided with a power key, a menu input key, an operation setting key, a temperature control key, an air volume key, a lock key, and the like.

The output unit 160 includes at least one of a lamp that is controlled to be turned on or blink, a speaker, and a display unit, and outputs an operation state of unit. The lamp outputs whether the unit is operating according to whether the lamp is turned on, the light color, and whether the lamp blinks, and the speaker outputs a state of operation by outputting a certain warning sound, sound effect, and voice guidance. The display unit may output a menu screen for controlling the unit, and output a guide message or warning composed of at least one combination of texts, numbers, and images of the unit's operation setting or operation state.

The detection unit 170 includes a plurality of sensors. The detection unit 170 may include a pressure sensor, a temperature sensor, a gas sensor, a humidity sensor, and a flow sensor. For example, a plurality of temperature sensors are provided to detect an indoor temperature, an outdoor temperature, an indoor heat exchanger temperature, an outdoor heat exchanger temperature, and a pipe temperature, and input the detected temperature to the controller 110. The pressure sensor is installed in the inlet and outlet of a refrigerant pipe, measures the pressure of the incoming refrigerant and the pressure of the discharged refrigerant respectively, and input the measured pressure to the controller 110. The pressure sensor may be installed in a water pipe as well as in the refrigerant pipe.

The drive unit 140 supplies the operating power to a control target according to the control command of the controller 110, and controls the driving. As described above, in the case of the outdoor unit, the drive unit 140 may be separately provided with a compressor drive unit, an outdoor fan drive unit, and a valve controller respectively controlling the compressor, the outdoor fan, and the valve. The drive unit 140 applies operating power to a motor provided in each of the compressor, the outdoor fan, the valve, and the like so that a designated operation is performed as the motor operates.

The communication unit 120 includes at least one wireless communication module, and communicates with other unit according to a control command of the controller 110. The communication unit 120 transmits and receives data in a designated wireless communication method between the controller, the outdoor unit, and the indoor unit, and applies the received data to the controller.

The communication unit 120 may include a plurality of communication modules, and communicate through the same or different communication modules when communicating with an outdoor unit and other indoor unit, communicating with a remote controller, and communicating with a controller. The communication unit 120 may selectively change a communication method in correspondence with a target to communicate with, and communicate by different communication methods depending on the target.

When different channels are used for communication with the indoor unit and communication with the controller, the communication unit 120 may set and transmit/receive data by setting channels according to a target to communicate with.

The communication unit 120 communicates using a frequency of a sub-GHz band having excellent transmission and diffraction characteristics in consideration of an attenuation effect of a wireless signal due to a wall in the building or an inter-floor obstacle. The communication unit 120 communicates using any one of the 400 MHz band and the 900 MHz band which are unlicensed bands that can be used for a specific small output radio station. The communication unit 120 may selectively use frequencies in the 400 MHZ band and the 900 MHZ band, in response to different regulations according to regions or countries.

In addition, the communication unit 120 may further include a communication module such as ZigBee, Bluetooth, NFC which are short-range communication methods.

The controller 110 controls data input and output through the input unit 150 and the output unit 160, manages data stored in the data unit 130, and controls transmission and reception of data through the communication unit 120.

The controller 110 generates a control command and applies to the drive unit 140 so as to operate according to a request from other unit or a set operation setting. Accordingly, the drive unit 140 allows a connected configuration, such as a compressor, an outdoor fan, a valve, an indoor fan, and a wind direction control means, to operate.

In addition, in a state where the unit is operating, the controller 110 determines an operation state in response to data input from a plurality of sensors of the detection unit 170, and determines an abnormality to output an error.

Figure 3:
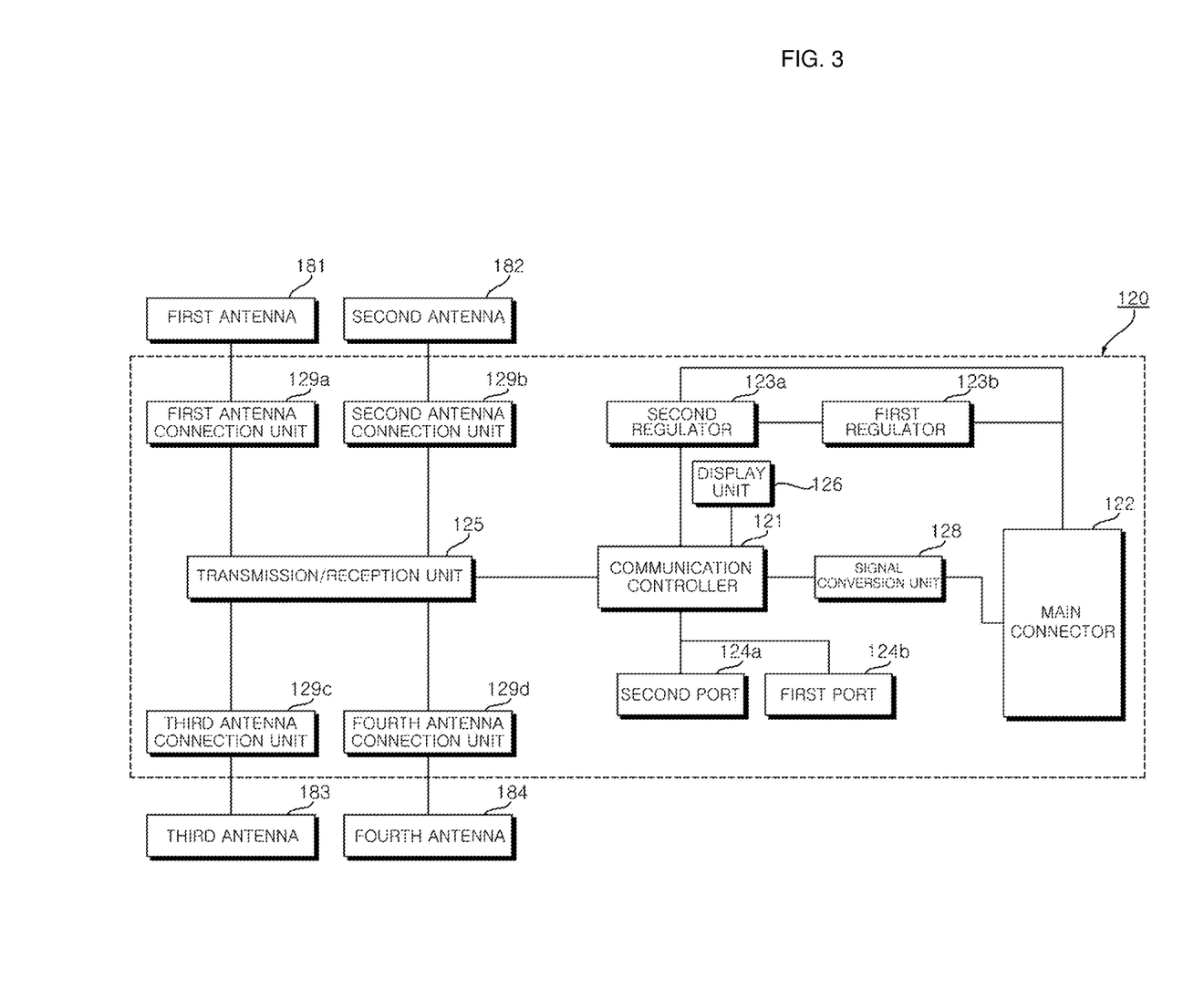
FIG. 3 is a block diagram schematically showing a configuration of a communication module for wireless communication of an air conditioner according to an embodiment of the present disclosure.

FIG. 3 is a block diagram schematically showing a configuration of a communication module for wireless communication of an air conditioner according to an embodiment of the present disclosure.

As shown in FIG. 3, the communication unit 120 includes a communication controller 121, a regulator 123a, 123b, a transmission/reception unit 125, an antenna connection unit 129a to 129d, a port 124a, 124b, a main connector, a display unit 126, and a signal conversion unit 128.

In addition, the communication unit includes a plurality of antennas 180.

The main connector 122 connects a unit and the communication unit 120. The main connector 122 may be a connection terminal coupled to a transmission/reception port provided in the unit. The main connector 122 inputs and outputs a voltage and a communication signal necessary for the communication unit 120 to operate and transmit and receive signals.

The main connector 122 applies a signal applied from a unit to the communication controller 121, and transmits a signal from the communication controller 121 to the controller 110 of the unit.

The signal conversion unit 128 converts a voltage of the signal input from the main connector and applies it to the communication controller. The signal conversion unit converts the signal to 3.3V and inputs it to the communication controller.

The regulator converts the voltage of the operating power applied from the indoor unit.

A first regulator 123b converts the voltage of the operating power applied from the unit through the main connector 122 from 12V to 5V, and a second regulator 123a converts the applied 5V to 3.3V.

The first regulator 123b is connected to the main connector 122 and connected to the second regulator 123a, so that when the voltage of the operating power 12V is converted into 5V by the first regulator, it is input to the second regulator.

The second regulator 123a converts a voltage of 5V input from the first regulator 123b to 3.3V and supplies it to the communication controller 121. In addition, the second regulator 123a is connected to the main connector 122, converts a voltage of 5V input from the main connector 122 to 3.3V, and supplies it to the communication controller 121.

The indoor unit applies the operating power of 12V to the communication unit 120, and the outdoor unit applies the operating power of 5V to the communication unit 120. The operating power input from the indoor unit is input through the main connector 122 and converted step by step from 12V to 3.3V through the first and second regulator, and supplied to the communication controller. The operating power input from the outdoor unit is 5V, is input through the main connector, converted from 5V to 3.3V by the second regulator, and supplied to the communication controller. The communication unit operates according to the supplied operating power. When a unit for applying a signal with a voltage excluding 12V or 5V exists among the plurality of units included in the air conditioner, a regulator for converting the voltage of a corresponding operating power may be further added.

The display unit 126 outputs an operation state of the communication unit 120, a network connection state, and a data transmission/reception state.

A second port 124a is a connection terminal for debugging a program installed in the communication unit, and a first port 124b is a connection terminal used to update the program or transmit data stored in the communication unit to the outside.

The communication controller 121 controls the operation of the transmission/reception unit 125, the regulator, the signal conversion unit, and the display unit according to the communication setting, so that the data of the unit applied through the main connector is transmitted with a set output and a signal of a specified frequency band. In addition, the received data is processed and applied to the unit. In addition, the communication controller 121 controls the data to be converted into a designated form according to the communication method used.

The communication controller 121 checks the communication state of the network to be connected, determines whether communication is possible, outputs the determination result through the display unit 126, and if there is an error in communication, accordingly outputs a warning. In addition, the communication controller 121 transmits the communication error to the unit through the main connector 122.

The first to fourth antenna connection units 129a to 129d are connected to the first to fourth antennas 181 to 184 respectively installed in the unit, apply a signal applied from the transmission/reception unit 125, and in addition, apply the signal received through the antenna to the transmission/reception unit 125. The antenna connection unit 129 is provided in correspondence with the number of antennas to be connected.

The antenna 180 is selectively used depending on the frequency band used among the 400 GHz band or the 900 MHz band of sub-Giga band. The shape of the antenna may be changed according to the frequency band used. The antenna 180 transmits a signal output from the transmission/reception unit 125 to the air, receives a signal of a designated frequency band in the air, and applies the received signal to the transmission/reception unit 125.

The transmission/reception unit 125 controls the output of a signal to be transmitted according to a control command of the communication controller 121. The transmission/reception unit 125 controls the output of a signal by controlling the output impedance, i.e. the impedance of the antenna 180 to have a set value. The transmission/reception unit 125 adjusts the impedance according to the frequency band of a signal to be transmitted and received through the antenna 180.

The transmission/reception unit 125 is a communication module supporting multiple input multiple output (MIMO). The transmission/reception unit is capable of performing a multiple input-output through a plurality of connected antennas. The transmission/reception unit transmits data through a plurality of antennas to various paths and detects a signal received through each path from a reception end.

MIMO is an antenna system capable of achieving spatial multiplexing, spatial diversity, and beam-forming, the spatial multiplexing is a technology that improves transmission speed by transmitting multiple information through a plurality of transmission antennas, the spatial diversity is a technology that controls errors by transmitting the same information multiple times through a plurality of transmission antennas, and the beam-forming is a technology that reduces interference by transmitting radio waves in a desired direction.

The transmission/reception unit transmits and receives signals using a plurality of antennas through MIMO so that a plurality of units distributed and installed in a building or the like communicate with each other.

Figure 4A:
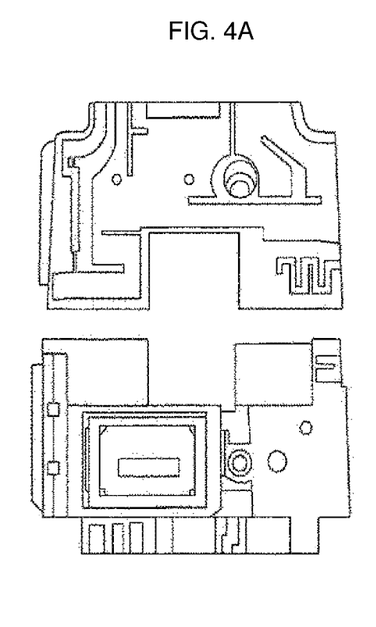
FIGS. 4A-4B is an exemplary view showing an antenna installed in a unit of an air conditioner according to an embodiment of the present disclosure.
Figure 4B:
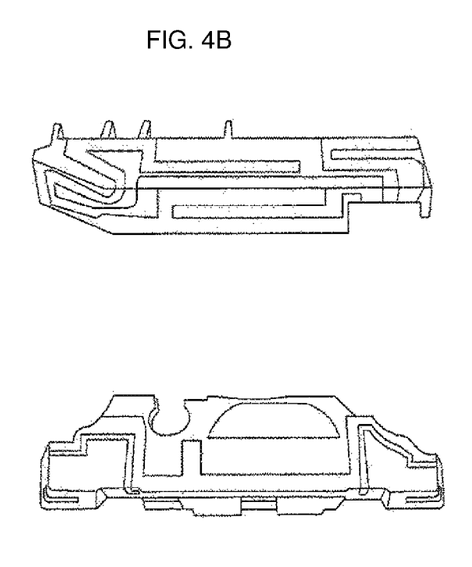

FIG. 4 is an exemplary view showing an antenna installed in a unit of an air conditioner according to an embodiment of the present disclosure.

As shown in FIG. 4, the antenna 180 is an Intenna installed inside the unit. As the antenna 180 is installed inside the unit, the antenna gain is lowered in comparison with an external antenna protruding to the outside, thereby reducing communication coverage.

However, as described above, the communication unit may apply MIMO technology to improve communication coverage by transmitting and receiving signals through a plurality of antennas.

As shown in FIGS. 4A and 4B, the antenna is configured to be easily installed inside the unit.

The unit of the air conditioner does not have a designated installation position for indoor unit or outdoor unit, but the installation position differs depending on the shape, structure, and purpose of use of the building. Accordingly, since the position of a target to be communicated is variously changed, it is preferable that an omni-directional antenna rather than a directional antenna having radiation and reception patterns set in a specific direction is used for the antenna 180.

The length of the antenna 180 is set according to the transmission frequency, and the length needs to be set in consideration of the installation environment. For example, in the case of a ceiling-type indoor unit, if the length of the antenna is too long, whether the ceiling-type indoor unit can be installed may depend on the size of the internal space of the ceiling.

Since the antenna length becomes longer as the transmission frequency is smaller, the frequency should be set in consideration of the length of the antenna, among available frequency bands.

The antenna length is $\lambda/2$ or $\lambda/4$ of the transmission frequency. For example, when the transmission frequency is 447 MHz, the wavelength is 0.67 m. When $\lambda/2$ is calculated, the length of the antenna is 34 cm, and in the case of $\lambda/4$, it is 17 cm. In the case of the 900 MHz band, the antenna length may be about 16.6 cm in the case of $\lambda/2$.

Since the antenna does not protrude from the unit to the outside, damage to the antenna may be prevented, and an aesthetic effect on the appearance of the unit may be improved.

Figure 5A:
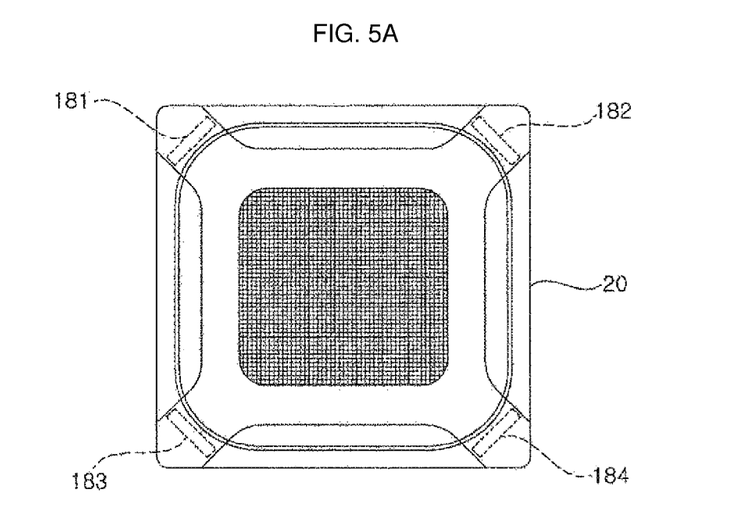
FIGS. 5A-5C is a view showing a unit of air conditioner and the installation position of an antenna according to an embodiment of the present disclosure.
Figure 5B:
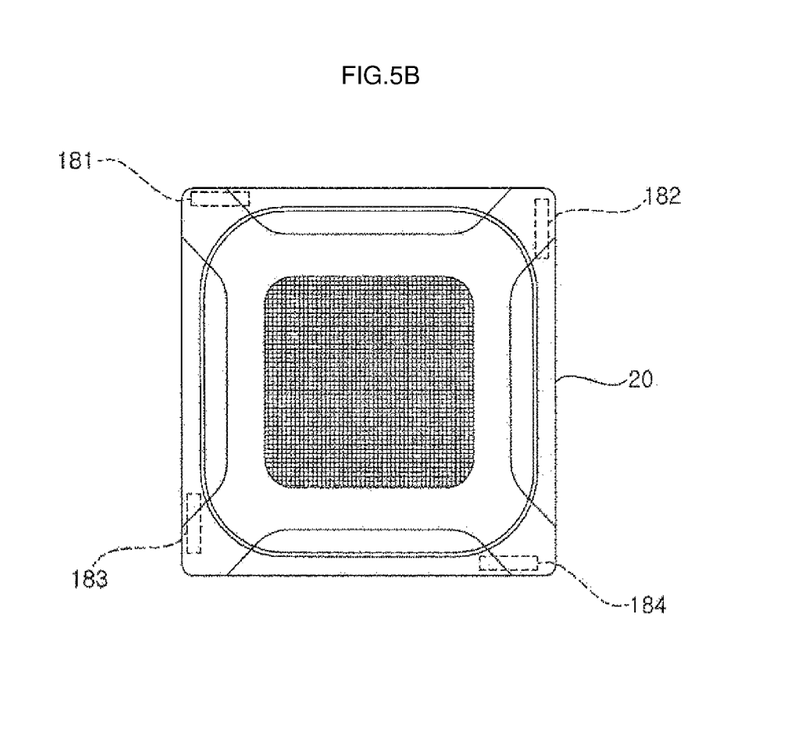
Figure 5C:
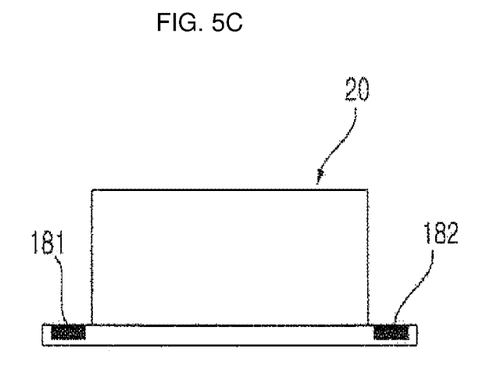

FIG. 5 is a view showing a unit of air conditioner and the installation position of an antenna according to an embodiment of the present disclosure.

In the air conditioner, a plurality of units transmit and receive data through a mutual wireless communication method. Since a plurality of units are not installed in a single floor, but are installed in a plurality of floors respectively to transmit and receive data, there exists an obstacle such as an inter-floor wall and furniture. Therefore, it is necessary to use a frequency band that can reach a signal over a certain distance while passing through obstacles in a building.

As shown in FIG. 5A, in a unit, a plurality of antennas 180, first to fourth antennas 181 to 184, are installed at different positions respectively. At this time, the number of antennas, for example, may be changed.

For example, the ceiling-type indoor unit may be provided with first to fourth antennas 181 to 184 which are installed respectively in each corner of an outer case where a suction port and a discharge port of the indoor unit are formed.

In addition, the antennas 180, 181 to 184 may be installed in four sides of the outer case of the indoor unit, as shown in FIG. 5B. Each antenna may be installed in one side of each of four sides of the outer case so as to be parallel to any one side of the case.

As shown in FIG. 5C, as the antenna is installed in the indoor unit case, the inner surface of the corner of the outer case of the indoor unit may be used as a ground.

As described above, since the length of the antenna differs depending on the frequency band used, the installation position may be set differently according to the frequency band used.

Among the sub-Giga bands, the ISM band (100 MHz, 200 MHz, 400 MHz, 900 MHz) has the advantage of being able to achieve communication between floors due to excellent transmission characteristics in a building. However, since the use of the frequency band is restricted for each country, it is preferable to select a frequency band in consideration of the restriction. In the Republic of Korea, 170 MHz, 200 MHz, 300 MHz and 400 MHz band channels are allocated as a frequency band for data transmission in small-power wireless devices.

Meanwhile, since the length of the antenna 180 is determined according to the band of the transmission frequency, in the case of the 100 MHz and 200 MHz bands, the antenna is lengthened, and thus the installation is restricted.

Accordingly, the air conditioner of the present disclosure communicates by using a frequency band of 400 MHz or 900 MHz, among the previously disclosed frequency bands, in consideration of the communication between floors and the antenna length.

According to the provisions of the Radio Law of the Republic of Korea, with respect to a frequency band of 400 MHz or 900 MHz, for wireless equipment for a specific small-power wireless station for data transmission, there are 21 channels of 424.7 MHz to 424.95 MHz, 11 channels of 447.8625 MHz to 447.9875 MHz, and 32 channels of 917 to 923.5 MHz for wireless equipment such as RFID/USN. Accordingly, it is possible to communicate by using these channels.

The unlicensed frequency bands for each country that can be used are as follows. North America and South America can use 902 to 928 MHz (FCC Part 15.247), Europe 433 MHz, 915 MHz, 863 to 868 MHz (ETSIEN300220), Japan 920 to 928 MHz (ARIB STD-T108), China 920 MHz, Korea 424 to 447 MHz, 917 to 923.5 MHz (KC), India 865 to 867 MHz (G.S.R 564(E)), Australia 433, 915 MHZ, South Africa 433 MHz, and 2.4 GHz and 5.725 GHz can be used in common worldwide. In addition, when North America and South America use 902 to 928 MHz, Europe uses 863 to 868 MHz, Japan 920 to 928 MHz, Korea 917 to 923.5 MHz, India 865 to 867 MHz, and 2.4 GHz and 5.725 GHz are used in common worldwide, communication is possible with a transmission speed 50 kbps or higher.

Figure 6:
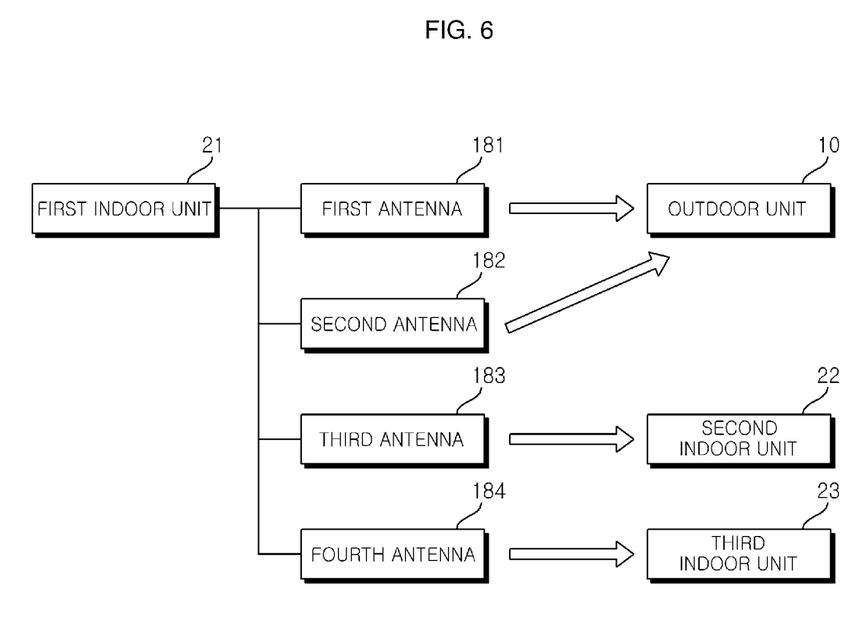
FIG. 6 is an exemplary view for explaining communication between units of an air conditioner according to an embodiment of the present disclosure.

FIG. 6 is an exemplary view for explaining communication between units of an air conditioner according to an embodiment of the present disclosure.

The air conditioner transmits and receives mutual data between a plurality of units through MIMO which is an antenna system capable of accomplishing multiple input and output.

Each unit performs multiple input and output through a plurality of antennas by applying Multiple Input Multiple Output (MIMO).

For example, the first indoor unit 21 may communicate with a plurality of devices through the first to fourth antennas 181 to 184, respectively. The communication unit of the first indoor unit may transmit different data through each antenna. The communication unit transmits independent signals to four transmission antennas by using the same frequency at the same time. The transmitted signals undergo spatially different fading (a phenomenon in which the strength of the received radio wave is rapidly changed according to a change in the medium through which the received radio waves passed) on a wireless channel, and thus there is a non-correlation between the signals received by each antenna. As each transmission antenna transmits a different signal, more data may be transmitted as many as the number of antennas.

In addition, the communication unit may transmit the same single data through four antennas. The communication unit determines data to be transmitted through each antenna according to the data transmission state, the magnitude of the transmitted data, and the like.

The first indoor unit 21 may communicate with the controller, the outdoor unit 10, a second indoor unit 22, and a third indoor unit 23 through the first to fourth antennas 181 to 184. The outdoor unit 10, the second indoor unit 22, and the third indoor unit 23 may include four antennas respectively.

In addition, the first indoor unit 21 may communicates with the outdoor unit 10 through the first and second antennas through the first to fourth antennas 181 to 184, while communicating with the second indoor unit 22 through the third antenna, and communicating with the third indoor unit 23 through the fourth antenna.

For example, the first indoor unit 21 may transmit first data to the second indoor unit through the first antenna, and transmit the first data to the outdoor unit through the second antenna.

In addition, the first indoor unit may transmit the first data to the second indoor unit through the first antenna, and simultaneously transmit second data to the outdoor unit through the second antenna.

The first indoor unit may transmit the first data to the second indoor unit through the first antenna, and simultaneously transmit the second data to the second indoor unit through the second antenna.

Meanwhile, the first indoor unit may simultaneously transmit the first data to the second indoor unit through the first to fourth antennas, respectively. Accordingly, the second indoor unit may receive the first data through four antennas, and receive the first data total four times.

In addition, the first indoor unit may transmit the first data to the second indoor unit through the first antenna, and receive third data from the second indoor unit through the second antenna.

When a data error occurs during communication, the first indoor unit 21 may transmit the same data through the first to fourth antennas 181 to 184, thereby reducing the occurrence of error. Since four same data are sent, the outdoor unit may receive data having no error.

In addition, as described above, as four antennas are installed in different positions, data may be received through an antenna that receives a specific signal well.

Therefore, according to the present disclosure, as a plurality of units of an air conditioner are configured to transmit and receive data in a wireless communication method, regardless of the installation environment, a direct communication can be achieved wirelessly between the indoor units, or between the indoor unit and the outdoor unit, and a direct communication can be achieved without sending data through other unit. In addition, the present disclosure may stably transmit a large amount of data with wide coverage by performing multiple input and output through a plurality of antennas.

Although embodiments have been described with reference to a number of illustrative embodiments thereof, it should be understood that numerous other modifications and embodiments may be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

EXPLANATION OF REFERENCE NUMERAL

| | |
|---|---|
| 10: outdoor unit | 20, 21 to 23: indoor unit |
| 110: controller | 120: communication unit |
| 130: data unit | 140: drive unit |
| 150: input unit | 160: output unit |
| 170: detection unit | |
| 180, 181 to 184: antenna | |
| 121: communication controller | |
| 125: transmission/reception unit | |
| 129a to 129d: antenna connection unit | |

The invention claimed is:

1. An air conditioner comprising a plurality of units including an outdoor unit and an indoor unit, wherein each of the plurality of units fixedly located in a plurality of spaces separated from each other comprises:
a controller configured to control an input/output and control to operate according to setting;
a plurality of antennas; and
a communication unit configured to transmit and receive data in a wireless communication method between the plurality of units through the plurality of antennas using a Sub-GHz frequency band, wherein a first unit among the plurality of units is configured to:
communicate with a second unit among the plurality of units using a first wireless communication method, through a first antenna among the plurality of antennas, and communicate with a third unit among the plurality of units using a second wireless communication method, through a second antenna among the plurality of antennas, wherein the first wireless communication method is a wireless communication method using a channel of a first frequency band corresponding to the second unit, wherein the second wireless communication method is a wireless communication method using a channel of a second frequency band corresponding to the third unit, and wherein the first frequency band and the second frequency band are included in the sub-GHz frequency band.

2. The air conditioner of claim 1, wherein the communication unit comprises the first antenna, the second antenna, a third antenna, and a fourth antenna.

3. The air conditioner of claim 1, wherein the plurality of antennas is installed in a case of the unit.

4. The air conditioner of claim 1, wherein the plurality of antennas is installed in four corners of a case of the unit.

5. The air conditioner of claim 1, wherein the first unit of the plurality of units communicates with the second unit, the third unit, a fourth unit and a fifth unit using the plurality of antennas, respectively.

6. The air conditioner of claim 1, wherein the first unit transmits first data to the second unit through the first antenna and to the third unit through the second antenna.

7. The air conditioner of claim 1, wherein the first unit transmits first data to the second unit through the first antenna and transmits second data to the third unit through the second antenna.

8. The air conditioner of claim 1, wherein the first unit transmits first data to the second unit through the first antenna and receives third data from the third unit through the second antenna.

9. The air conditioner of claim 1, wherein the first unit transmits the same data to the second unit multiple times using the plurality of antennas.

10. The air conditioner of claim 1, wherein the first unit transmits first data to the second unit through the first antenna, a third antenna, and a fourth antenna, respectively, and the second unit receives the first data multiple times through the plurality of antennas.

11. The air conditioner of claim 1, wherein the first unit transmits a plurality of data to the second unit, respectively, using the plurality of antennas except for the second antenna.

12. The air conditioner of claim 1, wherein the first unit transmits first data to the second unit through the first antenna and transmits second data to the second unit through a third antenna.

13. The air conditioner of claim 1, wherein the sub-GHz frequency band comprises any one of a frequency band for data transmission of a small-power wireless device and an unlicensed frequency band.

14. The air conditioner of claim 1, wherein the sub-GHz frequency band comprises any one of 400 Mhz band and 900 Mhz band in correspondence with an installation position and an installation country of the plurality of units.

15. The air conditioner of claim 1, wherein the communication unit comprises:
a plurality of antenna connection units respectively connected to the plurality of antennas; and
a transmission/reception unit configured to apply a signal of a certain frequency band to the plurality of antennas through the plurality of antenna connection units, and to process a signal received from the plurality of antennas.

16. The air conditioner of claim 15, wherein the transmission/reception unit transmits and receives data based on a Multiple Input Multiple Output (MIMO) scheme.

17. The air conditioner of claim 15, wherein the communication unit further comprises:
a main connector connected to the unit;

a regulator configured to convert an operation power supplied in a different magnitude according to a type of the unit; and a communication controller configured to control an input/output of data with the unit and to control the transmission/reception unit.

18. The air conditioner of claim 1, wherein the plurality of spaces separated from each other includes a plurality of spaces to be air conditioned in a building, the plurality of spaces to be air conditioned being separated by floors and walls.

19. The air conditioner of claim 1, wherein the plurality of units include ceiling-type indoor units.

20. The air conditioner of claim 19, wherein the plurality of antennas is provided at four corners of the ceiling-type indoor unit.

* * * * *